United States Patent [19]

Spooner

[11] 4,382,626
[45] May 10, 1983

[54] ATTACHMENT OF A STAINLESS STEEL OUTERBODY TO A GLASS REINFORCED PLASTIC INNER BODY

[75] Inventor: Colin R. Spooner, Norfolk, England

[73] Assignee: Delorean Research Limited Partnership, Bloomfield Hills, Mich.

[21] Appl. No.: 242,467

[22] Filed: Mar. 11, 1981

[51] Int. Cl.³ .............................................. B60P 3/03
[52] U.S. Cl. .................................... 296/31 P; 29/509; 428/418
[58] Field of Search .............. 296/31 P; 428/433, 418; 29/523, 509, 522 A

[56] References Cited

U.S. PATENT DOCUMENTS

| | | | |
|---|---|---|---|
| 2,730,772 | 1/1956 | Jones | 296/31 P |
| 3,836,192 | 9/1974 | Wilfert | 296/31 P |
| 3,875,661 | 4/1975 | Lidstrom | 296/31 P |
| 4,029,897 | 6/1977 | Mayer | 428/433 |
| 4,094,054 | 6/1978 | Fischer | 29/523 |
| 4,101,200 | 7/1978 | Daxinger | 428/433 |
| 4,101,704 | 7/1978 | Hiles | 296/31 P |
| 4,283,086 | 8/1981 | Morin | 296/31 P |

*Primary Examiner*—Joseph F. Peters, Jr.
*Assistant Examiner*—John A. Carroll
*Attorney, Agent, or Firm*—Kenyon & Kenyon

[57] ABSTRACT

In a structure comprising an inner molded glass reinforced plastic body and an outer shell of sheet material the sheet material is affixed to the body by at least one in-fill panel, the panel bonded to the body and the sheet material attached to the SMC panel by a plurality of self threading fasteners.

12 Claims, 4 Drawing Figures

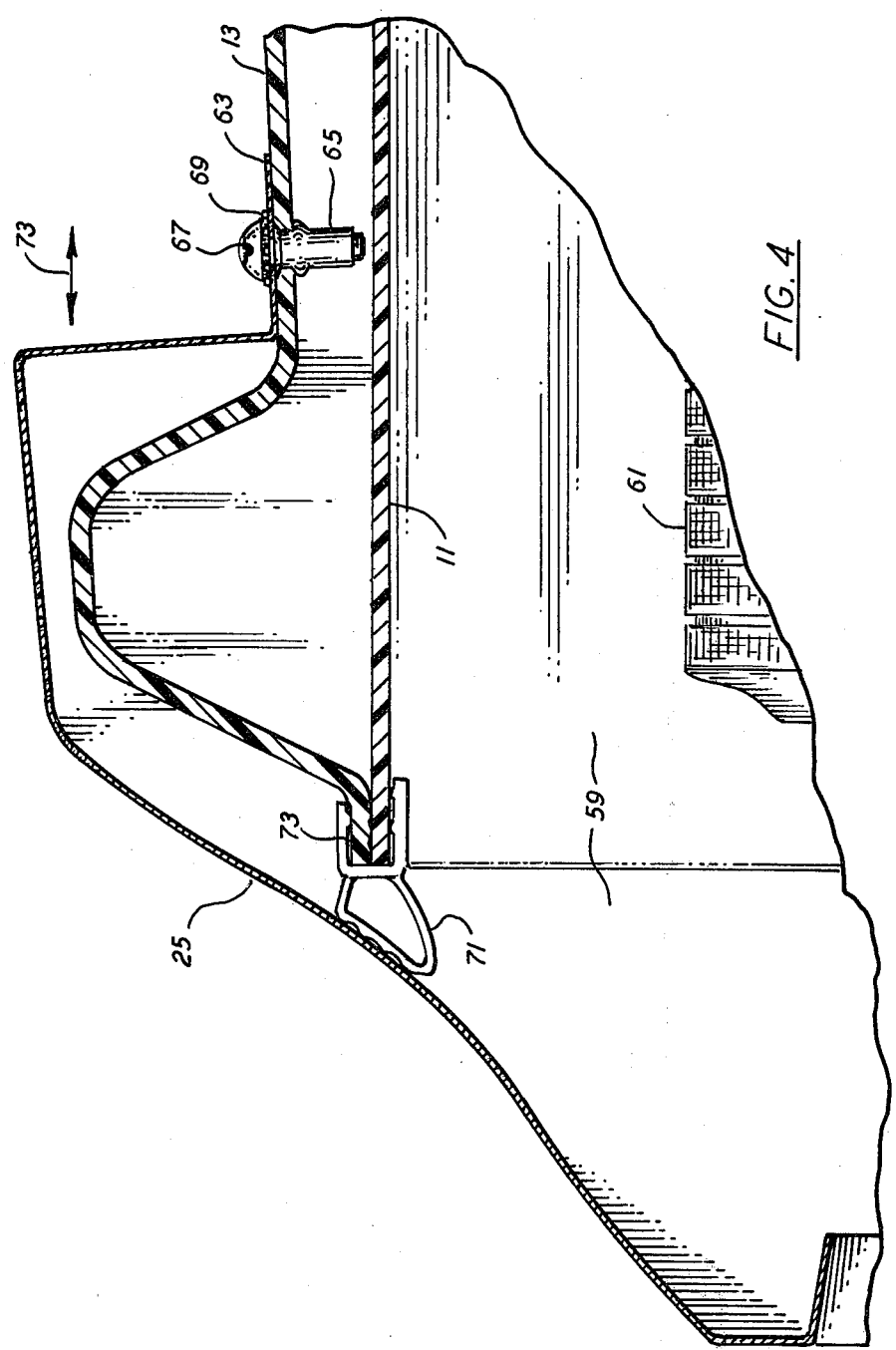

ATTACHMENT OF A STAINLESS STEEL OUTERBODY TO A GLASS REINFORCED PLASTIC INNER BODY

BACKGROUND OF THE INVENTION

This invention relates to vehicles and the like in general and more particularly to a method and manner of attaching an outer sheet metal body to an inner glass reinforced plastic body.

Glass reinforced plastic [GRP] has been widely used in manufacturing various types of vehicles. The most widespread use has probably been in the manufacture of boats. However, GRP has also been used in other vehicles such as snowmobiles and in automobile bodies. In most cases where GRP has been used as the body of an automobile, snowmobile or the like the GRP has formed the external body surface. Thus, it is molded with this in mind and is given a suitable finish. Hereinafter, the explanation of various problems and description of the manner in which the present invention overcomes these problems will be in terms of automobiles. However, the teaching is equally applicable to other vehicles and structures where the same object is desired, that is, having an inner body of GRP and an outer body of a sheet material or the like.

With automobile bodies the molding and finishing of GRP to provide the finished outer body poses a number of problems. Only those shapes which can be molded are usable; the body after molding must have the shape desired. A finish must be placed on the body which is attractive. Damage to such finish is not always easy to repair and, in fact, in the case of an automobile where part of the GRP body might be damaged in a crash, the problem of a repair which restores the look of the body to what it originally was is somewhat difficult. Furthermore, difficulties arise in maintaining tolerances where doors are located and so forth in order to give a really attractive outside appearance.

There has recently been proposed a construction in which a GRP inner body which forms the actual structural automobile body is sheathed with an outer body of a sheet metal, preferably stainless steel. Stainless steel is particularly attractive because of its long life, freedom from corrosion and its pleasing appearance. The problem exists, however, in such a case, of securing the stainless steel panels such as fender panels hood or bonnet panels, trunk or boot panels, etc., to the body in such a manner that they are secure and properly aligned with each other. This is a particular problem in view of the fact that the nature of molded GRP is such that exact tolerances cannot always be maintained. Obviously, a misalignment between a fender panel and a door panel in such a case could be most unsightly.

SUMMARY OF THE INVENTION

It is the object of the present invention to provide a method of attachment of an outer body comprising panels of sheet material such as stainless steel to an inner GRP body.

A further object is to provide method and means of attachment which will permit maintaining alignment between body panels and a door which is attached to the body.

A still further object is to provide a means of attachment which will aid in minimizing the amount of damage which must be repaired in the case of a collision.

An additional object is to provide a method of construction which achieves alignment of a door attached to the body and adjacent panels.

In general, the outer sheets are attached to the inner body in such a manner that, at least at the outer periphery, they are spaced from the inner body. This aids, in the case of a collision, in preventing damage to the inner GRP body and permitting the damage to be taken up by the panels of sheet material, e.g., stainless steel panels, which can easily be replaced. Furthermore, because of the basic sheathing concept, repairs to the GRP body, if necessary, can be done strictly on a structural basis without worrying about appearance since this repair will not show; only the outer skin will show. Since the outer skin is in sections, these sections, typically of metal, can be returned to the factory to be re-pressed. Only a small section need be replaced. Replacement is simplified and can be accomplished through the removal of a number of screws and replacement of a new section. In contrast, the metal bodies of most present day cars are of a utilized construction and replacement of a section entails great difficulty. In the preferred embodiment, attachment of the stainless steel panels to the GRP body at most points is by means of stainless steel screws engaging rivnuts which are embedded in the GRP body.

The critical points of attachment however are where panels meet up with a door for example. In accordance with the present invention, during the process of fettelling the body shells which have been molded, the body is brought to a jig where basic locating holes for door attachment and attachment of the body to the frame are drilled. Another jig which has a part with the same shape and exact dimensions as the outer panel of the door which is to be later mounted to the body is then located using these holes. This permits exactly determining the door extremities with the jig located at the same holes that will later be used to locate the door. The jig is used to locate sheet molding compound (SMC) in-fill panels at these locations of the door edges, i.e., at the front and back of the door. These panels are thus located in the forward and aft direction at the exact location where it is desired to mount the fenders, for example, which adjoin the door. The SMC panels are secured in place by bonding along with a number of screw fittings to aid in maintaining the panel fixed during bonding. With the edges of the door accurately located, it then becomes possible later in the manufacturing process to secure the adjoining panels to the SMC in-fill panels such as to match up with the door with the desired minimum gap.

The nature of the SMC material also provides a distinct advantage in that this material, in the case of collision, will tend to give and shatter before the GRP body will give. Thus, this construction further aids in absorbing the impact of a collision and further prevents damage to the structural parts of the automobile, i.e., the main body portion. Finally, the GRP panels perform the function of filling in and for that reason are called in-fill panels. That is to say, they properly fill in the space between the inner GRP body and the outer skin to maintain a pleasing appearance and to avoid undesirable gaps.

BRIEF DESCRIPTION OF THE DRAWINGS

FIG. 4 is a cross-sectional view showing the manner of attachment of a fender panel to the GRP body utilizing a stainless steel rivnut.

DETAILED DESCRIPTION

Figure 1:
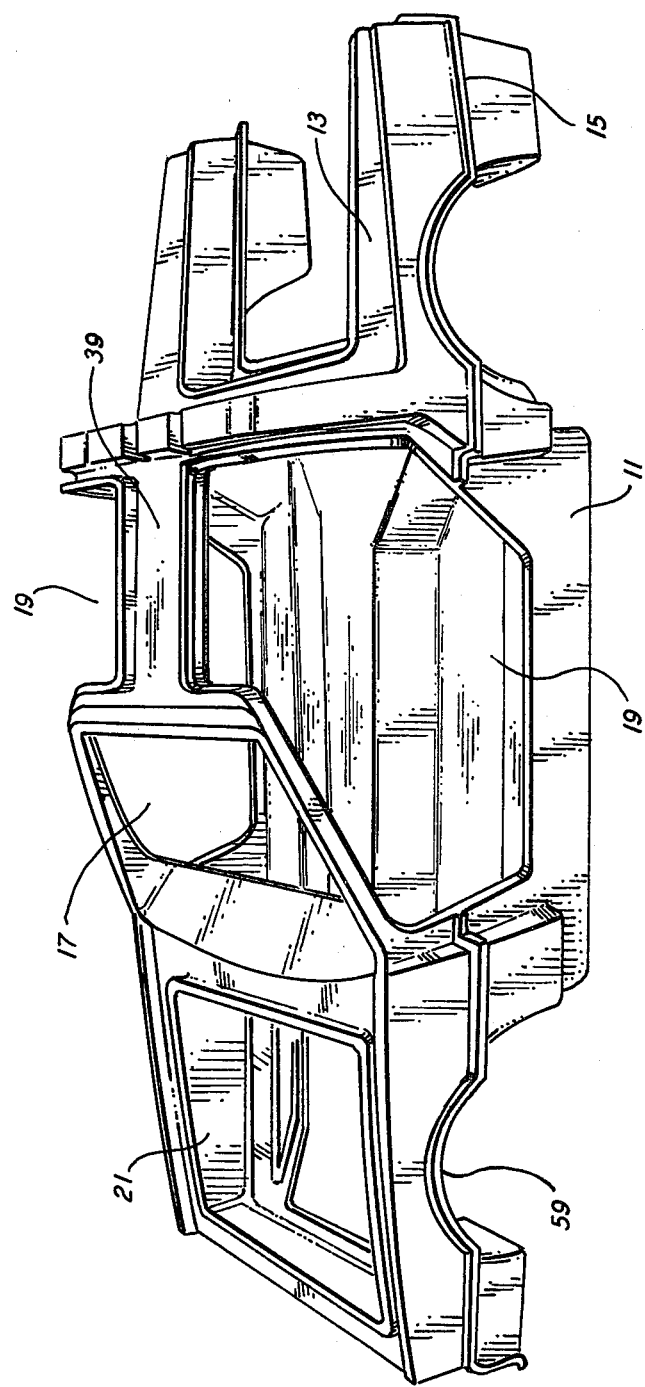
FIG. 1 is a perspective view of a molded GRP body to which outer panels are to be attached in accordance with the present invention.
Figure 2:
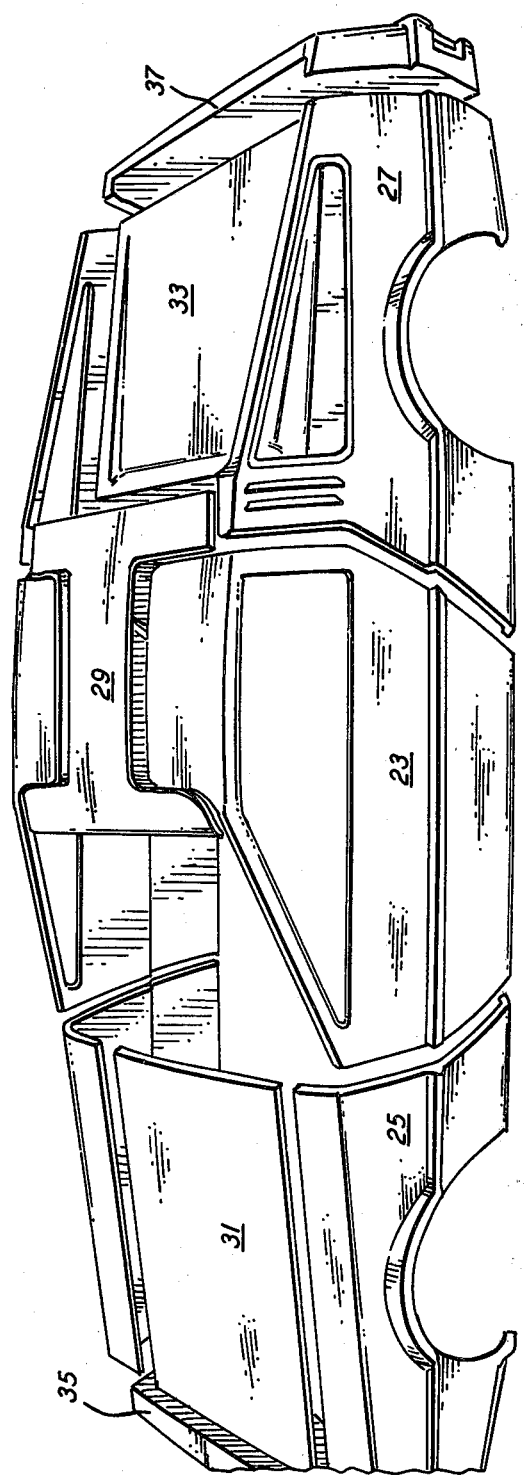
FIG. 2 is perspective view showing typical panels for attachment to a body such as FIG. 1.

As indicated previously, the present invention can be used in any instance where an outer sheet type shell, particularly one made of a number of panels, is to be attached to an inner body molded plastic body or the like. The invention is particularly applicable to the manufacture of automobiles. FIG. 1 illustrates an automobile body to which is to be mounted outer panels, preferably stainless steel, of the type shown in FIG. 2. The body of FIG. 1 is made utilizing a process more fully described in co-pending patent application Ser. No. 221,796 filed Dec. 31, 1980.

Figure 3:
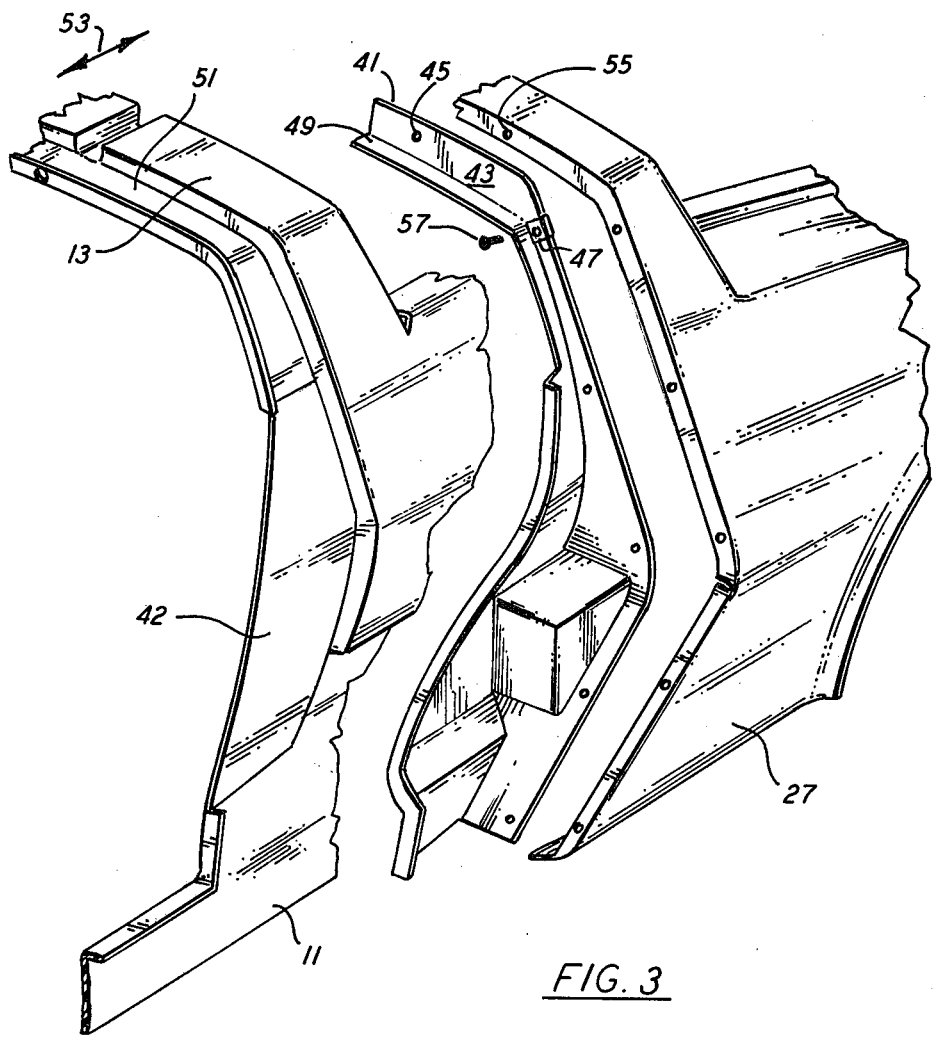
FIG. 3 is a perspective view showing the use of an SMC panel to attach a fender panel of FIG. 2 to the body of FIG. 1.

Basically, it comprises a lower molded part 11 and upper molded part 13 which are bonded and fastened together at a seam 15. After these two parts have been fastened, they are fettled to cut out a window opening 17, right and left door openings 19, and hood or bonnet openings 21. The door openings 19 will, of course, later be filled by a door which will include a door panel such as the panel 23 shown on FIG. 2. Also provided are front fender panels 25, rear fender panels 26, a roof panel 29, a hood panel 31 and a trunk panel 33. Front and rear bumper panels 35 and 37, respectively, of a resilient material are also provided. During the manufacturing of the body of FIG. 1, in addition to cutting the opening 17, 19 and 21, the body is accurately oriented and located and a jig placed thereon to drill key locating holes. These includes holes 38 in a roof section 39 for location the doors, along with other holes for mounting the body onto a frame. It is of particular importance that the front fender panel 25 and rear fender panel 27 match up with the edges of the door with a minimum gap. To accomplish this, the present invention utilizes SMC in-fill panels. A locating jig which takes the shape of the door and is positioned using the previously drilled holes is later used for positioning the SMC panels at the door edges. The jig includes means for holding the SMC panels and locating them against the body shown in FIG. 1 so as to properly locate the fender panels. Further, flat SMC panels 42 used only for fill-in are shown in FIG. 3. Part of the molded body is cut away at area 40 of FIG. 1 and the flat SMC panels 42 bonded in place to give the desired shape.

As also illustrated by FIG. 3 showing the rear SMC panel 41 for the left door, the skin locating SMC panels are of generally L shape including an outwardly extending portion 43 containing therein a plurality of holes 45 which are later equipped with self-tapping clip nuts 47. The SMC panel 41 also includes, perpendicular to the outwardly extending portion 41, a base portion 49 which is adapted to be received within a recess 51 molded into the GRP body parts 13 and 11. The recess 51 is wider than the width of the base portion 49. Thus, fore and aft movement for adjustment of the SMC panel 41 in the direction of the arrow 53 is possible. As indicated above, the SMC panel 41 is held by the jig and is brought into contact with the channel 51. It is then secured in place using a bonding material along with a number of fasteners to provide additional strength and to assure that the SMC panel 41 does not move while the bonding material is setting. Thickness variation in the bonding material is used to compensate for varying distances of the SMC panel 41 from the base of channel 51. Preferably, the bonding material comprises an epoxy. Since the SMC panel 41, and similar panels at the edges of each of the doors, is accurately located by the jig, when the rear fenders 27 and the corresponding fenders 25 in the front are put in place, they will match up correctly with the door which is mounted utilizing holes 38 in the roof section 39 which were drilled at the same time as the holes used to locate the in-fill panels 41.

The stainless steel fender panel 27 contains holes 55 which are slotted in the in and out direction so that, although the fore and aft location of the fender panel is fixed, it can be adjusted inwardly and outwardly to line up perfectly with the door. The stainless steel fender section 27 is then secured to the SMC panel using a plurality of screws 57 passing through the holes 55 and engaging with the self-tapping nuts 47. The mounting of the door to the body is the subject of co-pending application Ser. No. 231,398 filed on Feb. 4, 1981 and assigned to the same assignee as the present invention.

It is, of course, necessary to secure the fender panels at locations other than to the SMC panel. The manner in which this is accomplished is illustrated by FIG. 4. FIG. 4 illustrates a section in the vicinity of the front fender 25 near the wheel well 59. In FIG. 4 the tire 61 in the wheel well is visible. As shown, at this location, the fender 25 is formed with a flange 63 adapted to abut against the upper molded body part 13. A rivnut 65 is secured into the GRP body portion 13. The fender contains a slotted screw hole and is secured to the GRP body by means of a stainless steel screw 67 and lock washer 69 screwed into the rivnut 65. If desired, a rubber spacer 71 may be provided with a gripping portion 73 clamped around the junction between the lower molded body part 11 and upper molded body part 13. In many instances, this will not be necessary. A plurality of such fastenings are provided, as required, along the length of the fender. Similar attachment takes place with the rear fenders 27. The lids 31 and 33 will be mounted using conventional hinging techniques. Adjustment of the gap between the lids and the corresponding fenders can be carried out to a certain degree by an inward and outward movement in the direction of arrow 73 on in FIG. 4. It is partially for this reason that slotting of the hole through which the stainless steel screw 67 passes is provided. In addition, a small gap at this point is not as critical as it is at the doors. Since the fender panels are located in reference to the doors, they may extend more or less forward or aft depending on the tolerances of a particular automobile. The differences are, of course, very small and relate only to manufacturing tolerances in the body. However, any small differences are corrected by means of the front and rear bumper panels 35 and 37 which finish off the front and rear of the outer shell.

What is claimed is:

1. A structure comprising:
   (a) an inner molded plastic body made of glass reinforced plastic;
   (b) an outer shell of at least one panel of sheet metal affixed thereto;
   (c) channels formed in said molded plastic body for receiving in-fill panels;

(d) at least one in-fill panel attached to said inner body and extending out therefrom, said in-fill panel having generally an "L" shape, the base of said "L" adapted to rest in said channel with the other portion of said "L" shaped panel projecting therefrom and providing a surface to which said sheet metal may be connected; and (e) means connecting said sheet metal to said in-fill panel.

2. The invention according to claim 1 wherein said in-fill panels are made of SMC.

3. The invention according to claim 1 and further comprising a plurality of holes in said projecting portion; a self threading fastener at each of said holes; a flange in an edge of said sheet metal containing matching holes and bolts extending through said hole and matching holes and threaded into said fastening means attaching said sheet metal to said in-fill panel.

4. The invention according to claim 3, wherein the width of said channel is greater than the width of said base, whereby adjustment of said panel within said channel is possible.

5. The invention according to claim 4 wherein said matching holes are slotted to permit adjustment.

6. The invention according to claim 5, wherein said molded glass reinforced plastic body comprises an automobile body.

7. The invention according to claim 6, wherein said sheet metal comprises stainless steel and said bolts are stainless steel bolts.

8. The invention according to claim 7 and further including means attaching another part of said sheet metal panel to said molded body directly comprising:

(a) said sheet metal bent, at the point of desired contact, so as to form a flange contacting said molded plastic body with a portion of said sheet metal remote from said flange spaced from said body;

(b) a hole formed in said sheet body at the desired point of attachment; a rivnut embedded in said molded plastic body at the desired point of attachment;

(c) a bolt passing through said hole and threaded into said rivnut; and (d) a lock washer between said bolt and sheet metal material, said bolt and lock washer securing said sheet metal against said molded plastic body.

9. The invention according to claim 8 wherein said sheet metal panel comprises a fender panel adjacent to a door and said infill panel is at a location defining the door edge, and said direct attachment remote therefrom.

10. An arrangement for attaching a sheet metal outer body to an inner molded plastic body directly, said sheet metal wrapping around and cladding said body and over most parts of said body being spaced therefrom, comprising:

(a) said sheet metal being bent, at the point of desired contact so as to form a flange contacting said molded plastic body with a portion of said sheet metal remote from said flange spaced from said body;

(b) a hole formed in said sheet metal at the desired point of attachment; a rivnut embedded in said molded plastic body at the desired point of attachment;

(c) a bolt passing through said hole and threaded into said rivnut;

(d) a lock washer between said bolt and sheet metal material, said bolt and lock washer securing said sheet metal against said molded plastic body; and (e) resilient bumpers attached to said body at points of close contact with said sheet metal to absorb minor shocks.

11. The arrangement according to claim 10 wherein the hole in said sheet metal is slotted to permit adjustment.

12. A method of directly attaching a sheet metal outer body panel to a molded plastic inner body, said sheet metal wrapping around and cladding said body and over most parts of said body being spaced therefrom, comprising:

(a) forming a hole in the plastic body at the desired point of fixing;

(b) inserting a rivnut in said hole so as to be rigidly attached to said body;

(c) forming a flange containing a hole at the point of desired attachment on said sheet metal panel;

(d) attaching said sheet metal panel to said molded plastic body utilizing a bolt extending through said hole in said panel into said rivnut with a lock washer between the head of said bolt and said panel; and (e) disposing resilient bumpers between said body and said sheet metal at points of close contact to absorb minor shocks.

* * * * *